United States Patent
Kizler et al.

[11] Patent Number: 5,944,365
[45] Date of Patent: Aug. 31, 1999

[54] PIPE CLAMP WITH A HEADED BOLT FOR SECURING A PIPE CONNECTION

[75] Inventors: Wolfgang Kizler, Fellbach; Gerd Tiefenbacher, Esslingen, both of Germany

[73] Assignee: Daimler-Benz Aktiengesellschaft, Stuttgart, Germany

[21] Appl. No.: 08/936,747

[22] Filed: Sep. 25, 1997

[30] Foreign Application Priority Data

Sep. 25, 1996 [DE] Germany ................................ 19639324

[51] Int. Cl.⁶ ........................................................ F16L 21/06
[52] U.S. Cl. .......................... 285/420; 285/419; 285/905; 29/890.08; 411/401
[58] Field of Search .................... 29/890.08; 285/187, 285/329, 373, 419, 420, 422, 905, 380; 24/19, 279, 280; D8/396, 397; 411/399, 401, 380, 381, 382, 392

[56] References Cited

U.S. PATENT DOCUMENTS

| | | | |
|---|---|---|---|
| 649,916 | 5/1900 | Dietrich | 24/279 |
| 1,915,924 | 6/1933 | Coe | 24/279 X |
| 3,718,351 | 2/1973 | Bakkerus | 285/373 X |
| 4,196,673 | 4/1980 | Looks | 24/287 X |
| 4,312,526 | 1/1982 | Cassel | 285/419 |
| 4,530,524 | 7/1985 | Stephens | 285/187 |
| 4,629,226 | 12/1986 | Cassel et al. | 285/420 X |
| 4,813,720 | 3/1989 | Cassel | 285/419 |
| 5,010,626 | 4/1991 | Dominguez | 24/279 |

FOREIGN PATENT DOCUMENTS

| | | | |
|---|---|---|---|
| 0 222 784 | 3/1990 | European Pat. Off. . | |
| 0 369 482 | 5/1990 | European Pat. Off. | 29/890.08 |
| 41 19 171 | 1/1992 | Germany . | |
| 1609940 | 11/1990 | U.S.S.R. | 285/905 |
| WO 80/02317 | 10/1980 | WIPO | 285/420 |
| 86/06145 | 10/1986 | WIPO . | |

OTHER PUBLICATIONS

Norma Schellen, Sep. 1975.

Primary Examiner—Lynne Reichard
Assistant Examiner—Greg Binda
Attorney, Agent, or Firm—Evenson, McKeown, Edwards & Lenahan, PLLC

[57] ABSTRACT

A pipe clamp with a headed bolt for securing a pipe connection, in particular pipes of the exhaust system of a motor vehicle which are to be connected to one another, in the case of which the end of a first pipe is pushed into an axially slit end of a second pipe and, when the headed bolt is tightened, the pipe clamp, fitted on the slit pipe end, connects the two pipe ends to one another in a frictionally locking manner, is to be secured against a reduction in clamping force. For this purpose, the pipe clamp is formed of a material which has a higher coefficient of expansion than does the material of the pipes which are to be connected. The head of the headed bolt is elongated, in order to avoid impermissibly high local stressing during tightening of the pipe clamp. Due to the elongate form of the head of a headed bolt, the forces on the pipe clamp which support the tightening torque are reduced by a lengthening of the lever arm with respect to the axis of the headed bolt.

7 Claims, 1 Drawing Sheet

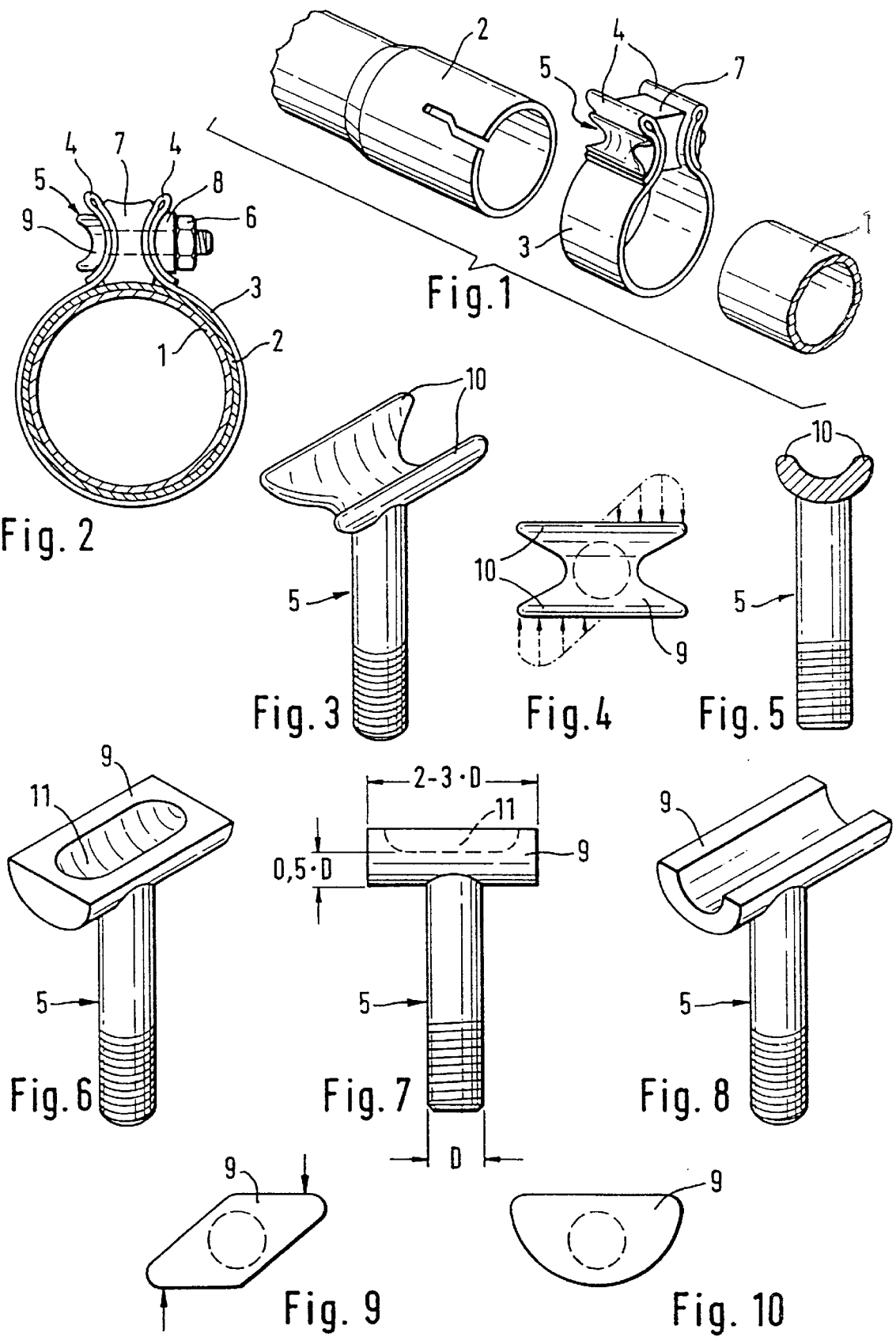

PIPE CLAMP WITH A HEADED BOLT FOR SECURING A PIPE CONNECTION

BACKGROUND AND SUMMARY OF THE INVENTION

This application claims the priority of German patent document 19639324.8, the disclosure of which is expressly incorporated by reference herein.

The invention relates to a pipe clamp with a headed bolt for securing a pipe connection, in particular pipes of the exhaust system of a motor vehicle which are to be connected to one another. More particularly, the invention relates to a pipe connection in which the end of a first pipe is pushed into an axially slit end of a second pipe and, when the headed bolt is tightened, the pipe clamp, fitted on the slit pipe end, connects the two pipe ends to one another in a frictionally locking manner.

In the case of such a pipe clamp, load is introduced not uniformly but via a plurality of contact points running on the lateral surface of the adjacent pipes. In addition, there is a local pressure point in the region of the lock of the pipe clamp. Local concentrations of stressing arise at each contact point. In unfavorable conditions, the production of the connection causes the inner pipe to expand permanently even at room temperature. In contrast, since the outer pipe, which encloses the inner pipe, is slit axially, there are no unacceptable concentrations of stressing there.

As the temperature increases, the yield point of the pipe materials decreases sharply. This means that, in the case of pipe clamps which are subjected to high stressing, the pipe material may creep, this applying, in particular, to the non-slit, inner pipe. This means that, after cooling, the inner pipe, which is clamped by the outer pipe, may be deformed to a smaller diameter. As a result, the clamping force in the connection can decrease to such an extent that the pipes which are inserted into one another can be displaced or can turn and, in addition, are no longer sealed. This may be the case, in particular, with exhaust pipes with a connection of the type generally described above, since temperatures of up to 800° C. can prevail at these pipes. Stressing which exceeds the flow limit of the material of the inner pipe of connection of the type generally described above may occur, in particular, when, in the event of the exhaust system heating up quickly, there is a difference in temperature between the inner pipe, which has hot exhaust gases flowing through it, and the pipe clamp, which is cooled by the relative wind. Such a difference in temperature may be, for example, 180° C. In this case, the pipe clamp exerts an increased clamping force as a result of the different heat expansions. This results, in turn, in increased permanent deformation of the inner pipe. The problems outlined above arise, for example, in the case of a pipe connection according to European patent document EP 0 222 784 B1, said pipe connection being secured by a pipe clamp of the type generally described above.

A goal of the present invention is to remedy the aforementioned problems such that it is not possible, in the case of a pipe-clamp pipe connection of the type generally described above, for there to be any reduction in clamping force which adversely affects the secureness of the pipe connection.

This and other goals have been achieved according to the present invention by providing a pipe clamp with a headed bolt for securing pipes of an exhaust system of a motor vehicle which are to be connected to one another by fitting an end of a first of said pipes into an axially slit end of a second of said pipes, said pipe clamp being fitted over the axially slit end with said headed bolt being tightened to connect the two pipe ends to one another in a frictionally locking manner, wherein the pipe clamp consists of a material which has a higher coefficient of expansion than a material of the pipes which are to be connected to one another.

This and other goals have been achieved according to the present invention by providing a pipe connection in an exhaust system of a motor vehicle, comprising: a first exhaust pipe; a second exhaust pipe having an axially slit end to be fitted over an end of said first exhaust pipe; and a pipe clamp to be fitted over said axially slit end of the second exhaust pipe, said pipe clamp being adjustable via a bolt, said bolt being rotatable to adjust an inner periphery of said pipe clamp to frictionally engage said axially split end of the second exhaust pipe and to bias said axially split end of the second exhaust pipe into frictional engagement with said first exhaust pipe, said pipe clamp being formed of a material which has a higher coefficient of thermal expansion than a material of said first and second exhaust pipes.

This and other goals have been achieved according to the present invention by providing a method of forming a pipe connection in an exhaust system of a motor vehicle, said method comprising the steps of: selecting a first exhaust pipe made of a first material having a first coefficient of thermal expansion; selecting a second exhaust pipe with an axially split end, said second exhaust pipe being made of said first material; selecting a pipe clamp made of a second material having a second coefficient of thermal expansion which is higher than said first coefficient of thermal expansion, said pipe clamp being adjustable via a bolt; fitting said axially slit end of said second exhaust pipe over an end of said first exhaust pipe; fitting said pipe clamp over said axially slit end of the second exhaust pipe; rotating said bolt to adjust an inner periphery of said pipe clamp to frictionally engage said axially split end of the second exhaust pipe and to bias said axially split end of the second exhaust pipe into frictional engagement with said first exhaust pipe.

In a state in which the pipe clamp is at a considerably lower temperature than the pipes which it is to clamp with respect to one another, the material pairing of the present invention avoids a constriction, as a result of the difference in temperature, to the extent where the inner pipe is deformed permanently due to too high a clamping force.

According to the preferred embodiment of the present invention, the headed bolt has an elongate head which, in the state in which it is mounted on the pipe clamp, is aligned parallel to the axis of the pipe clamp. The invention relates to, for example, a pipe clamp which is a metal strip which is bent in the form of a circular ring and, for the purpose of receiving a headed bolt, has ends which are designed as double-layered perforated lugs. The free end of the shank of the headed bolt is provided with a thread and serves for receiving a nut. When the pipe clamp is in the mounted state, it has a shaped clamping piece, which is located between the lugs and through which the headed bolt passes, and a shaped part between the nut of the headed bolt and the adjacent lug of the pipe clamp. Such a pipe clamp is illustrated and described, for example, in European patent document EP 0 222 784 B1, mentioned above.

The elongate bolt-head form, aligned in the axial direction of the pipe clamp, is used in order to avoid local stressing when the nut is tightened onto the headed bolt. For supporting the torque which occurs when the nut is tightened, it is important to have, for the occurrence of relatively low supporting force, a long lever arm between the force transmission which takes place at the bolt head with respect to the lug of the pipe clamp and the axis of the headed bolt. If there are low supporting forces during the transmission from the bolt head to the pipe clamp, the risk of impermissibly high local stressing at the pipe clamp decreases.

Recesses in the bolt head at points where, in particular, there is no lateral abutment against the pipe clamp are advantageous and, in some cases, even necessary if hammer-head bolts are used. This is because, if there is no recess, a relatively large volume has to be deformed, and this can result in deformation cracks in the region of the bolt heads.

Other objects, advantages and novel features of the present invention will become apparent from the following detailed description of the invention when considered in conjunction with the accompanying drawings.

BRIEF DESCRIPTION OF THE DRAWINGS

FIG. 1 shows an exploded view of a pipe connection using a pipe clamp according to a preferred embodiment of the present invention;

FIG. 2 shows a section through the pipe clamp according to FIG. 1;

FIG. 3 shows a perspective view of a hammer-head bolt with a head in double-runner form;

FIG. 4 shows a plan view of the head of the hammerhead bolt according to FIG. 3, the force profile during clamping of the pipe clamp also being depicted;

FIG. 5 shows a section through the center of the hammer-head bolt according to FIG. 3;

FIG. 6 shows a perspective view of hammer-head bolt with a trough-like recess in the end face of the hammer head;

FIG. 7 shows a view of the hammer-head bolt according to FIG. 6 with the trough-like recess indicated;

FIG. 8 shows a further embodiment of hammer-head bolt, which has a hammer head configured in the form of a horseshoe;

FIG. 9 shows the plan view of a hammer-head bolt with a hammer head which, in this view, is of trapezoidal configuration; and FIG. 10 shows a plan view of a hammer head with an end face which is configured in the form of a segment of a circle.

DETAILED DESCRIPTION OF THE DRAWINGS

The pipes 1 and 2 shown in the exploded illustration in FIG. 1 are pushed into one another in order to be connected to one another. The different diameters mean that the pipe 1 functions as an inner pipe and the pipe 2 functions as an outer pipe. The outer pipe 2 is slit axially. For the pipe connection, a pipe clamp 3 is fitted on the slit end region of the outer pipe 2.

The pipe clamp 3 consists of metallic strip material which is bent to form a ring, the strip ends being shaped to give perforated lugs 4 at each end which are double-layered. A hammer-head bolt 5 passes through the lugs 4 and a nut can be screwed onto the free, threaded end of the shank of the bolt. A shaped clamping piece 7 is located between the lugs 4. The nut 6 does not butt directly against the adjacent lug 4; rather, it butts against a shaped piece 8 interposed between the lug 4 and the nut.

The hammer head 9 of the hammer-head bolt 5 may be in double-runner form, as is illustrated specifically in FIGS. 3 to 5, and may have a length which corresponds to a width of the pipe clamp 3. In relation to their longitudinal extent, the runners 10 are connected to one another in their central region adjacent to the axis of the hammerhead bolt 5. These runners 10 have freely extending regions at their ends. The convex inwardly-facing surfaces of the runners 10 are supported against the concave, outwardly-facing surface of the strip material of one of the lugs 4 of the pipe clamp 3 in a frictionally and positively locking manner. In particular the freely extending ends of the runners 10 transmit the supporting force during the transmission of the tightening or loosening torque in the event of the nut 6 of the hammer-head bolt 5 being tightened or loosened, respectively. Those force-transmission regions between the hammer head 9 and the adjacent pipe clamp which take effect when the nut 6 is tightened are indicated by arrows in FIG. 4.

In the case of the hammer-head embodiment according to FIG. 6, a trough-like recess 11 is located in the end face. In relation to the embodiment with the trough-like recess according to FIG. 6, the double-runner embodiment of the hammer head 9 according to FIG. 3 has the advantage that the main force transmission of the tightening or loosening torque is effected in freely extending material regions, i.e. in material regions which have more compliance, or resilience, than the more rigid configuration of the hammer head 9 with trough-like recess 11 of FIG. 6. Due to the compliance of these supporting regions, it is possible for force, distributed over a relatively large surface area, to be introduced "smoothly" into the pipe clamp 3.

As far as the abovementioned torque-transmission properties are concerned, the horseshoe-like hammer-head embodiment according to FIG. 8 comes between the embodiments of the hammer-head bolt according to FIGS. 3 to 5, on the one hand, and the embodiment according to FIG. 6, on the other hand, in terms of quality of force distribution.

FIG. 7 shows one preferred embodiment of the hammer-head bolt 5 according to FIG. 6, showing advantageous relative dimensions of this hammer-head bolt 5. According to these dimensions, the length of the hammer head 9 should correspond approximately to twice to three times the shank diameter D. Furthermore, between the point of transition of the shank into the hammer head 9 and the recess 11 provided in the hammer head in the shank region, there should be at least one compact material region of a depth of approximately half the shank diameter, in order to ensure sufficient force transmission there.

In the case of the design of a hammer head 9 according to FIG. 9, in which said hammer head has a trapezoidal end face, in each case opposite ends of the trapezium engage a lug 4 of the pipe clamp 3 in order to ensure the torque transmission during tightening of the pipe clamp 3.

In the case of the circle-segment hammer-head design according to FIG. 10, small torques take effect with respect to the pipe clamp 3 at the essentially rectilinear hammer-head transverse side, during mounting and demounting of the pipe clamp 3, as a result of long lever arms which are present there. In the case of the embodiment according to FIG. 9, on the other hand, this is the case only during tightening of the pipe clamp 3.

With regard to the contemplated forms of elongate bolt heads 9 which can be used, it is particularly advantageous if the rigidity in the transverse direction of said bolt heads decreases towards the ends in order thus to be able to achieve smooth load introduction into the adjacent pipe clamp. This is particularly important if the pipe clamp, as a component, has low inherent rigidity. As far as possible throughout the entire region where it rests on one of the lugs 4, the bolt head 9 should have a form fit with respect to said lug in order that, when the pipe clamp 3 is mounted, full-surface abutment between the bolt head 9 and the adjacent lug 4 of the pipe clamp 3 can be attained.

In order to be able to achieve the different expansions between pipe clamp 3 and pipes 1, 2 which are desired according to the invention, the pipe clamp 3 consists of a material which has a higher coefficient of expansion than does the material of the pipes 1, 2. It is contemplated, for example, that the pipes 1, 2 consist of ferritic steel and that the pipe clamp 3 consists of austenitic steel. If the pipe connection is exposed merely to relatively low temperatures, then, if the pipes 1, 2 are made of steel, the pipe clamp 3 can consist of aluminum, which has a high coefficient of thermal expansion. The different coefficients of expansion for the pipes 1, 2, on the one hand, and the pipe clamp 3, on the other hand, gives the advantage that, with an increase in temperature, the pipe clamp 3 expands to a greater extent than the inner pipe 1. The clamping force is reduced as a result and thus, even if the material of the inner pipe 2 has a reduced yield point on account of temperature, said inner pipe is not permanently compressed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A pipe connection comprising:

pipes of an exhaust system of a motor vehicle which are to be connected together, a headed bolt and a nut for securing said pipes of said exhaust system of the motor vehicle to one another by fitting an end of a first of said pipes into an axially slit end of a second of said pipes, a pipe clamp which is to be fitted over the axially slit end and tightened by said headed bolt and the nut to connect the two pine ends to one another in a frictionally locking manner, said pipe clamp defining lugs at opposite ends thereof through which said bolt extends, a clamping piece which is to be located between the lugs, and a shaped piece which is to be disposed between one of the lugs and said nut, wherein said headed bolt has a head in the form of a hammer head, said hammer head defining at least one recess on a side facing away from a shank of the bolt.

2. A pipe clamp according to claim 1, wherein, at least in a central region of the headed bolt, a base of the recess in the hammer head is spaced from the end of the shank of the headed bolt by at least half the value of the diameter of the shank.

3. A pipe connection comprising:

pipes of an exhaust system of a motor vehicle which are to be connected together, a headed bolt and a nut for securing said pipes of said exhaust system of the motor vehicle to one another by fitting an end of a first of said pipes into an axially slit end of a second of said pipes, a pipe clamp which is to be fitted over the axially slit end and tightened by said headed bolt and the nut to connect the two pipe ends to one another in a frictionally locking manner, said pipe clamp defining lugs at opposite ends thereof through which said bolt extends, a clamping piece which is to be located between the lugs, and a shaped piece which is to be disposed between one of the lugs and said nut, wherein said headed bolt has a head in the form of a hammer head, said hammer head having two opposite transverse sides, a longitudinal extent of the transverse sides being asymmetrical with respect to an axis of the hammer head.

4. A pipe clamp according to claim 3, wherein, on the two opposite transverse sides of the hammer head, the longitudinal extent is largest at opposite ends, as seen in the longitudinal direction on either side of the axis of the hammer head.

5. A pipe connection comprising:

pipes of an exhaust system of a motor vehicle which are to be connected together, a headed bolt and a nut for securing said pipes of said exhaust system of the motor vehicle to one another by fitting an end of a first of said pipes into an axially slit end of a second of said pipes, a pine clamp which is to be fitted over the axially slit end and tightened by said headed bolt and the nut to connect the two pipe ends to one another in a frictionally locking manner, said pipe clamp defining lugs at opposite ends thereof through which said bolt extends, a clamping piece which is to be located between the lugs, and a shaped piece which is to be disposed between one of the lugs and said nut, wherein the headed bolt has a head which is configured to be larger in an axial direction of the pipe clamp than in a direction perpendicular thereto, and wherein a length of the head in the axial direction is two to three times the diameter of a shank of the bolt.

6. A pipe connection in an exhaust system of a motor vehicle, comprising:

a first exhaust pipe;

a second exhaust pipe having an axially slit end to be fitted over an end of said first exhaust pipe;

a pipe clamp to be fitted over said axially slit end of the second exhaust pipe, said pipe clamp being adjustable via a bolt and a nut which is rotatable to adjust an inner periphery of said pipe clamp to frictionally engage said axially split end of the second exhaust pipe and to bias said axially split end of the second exhaust pipe into frictional engagement with said first exhaust pipe, said pipe clamp defining lugs at opposite ends thereof through which said bolt extends;

a clamping piece which is to be located between the lugs; and a shaped piece which is to be disposed between one of the lugs and said nut, wherein said bolt includes a head and a shank defining an axial direction of said bolt, said head including a surface which engages a mating surface of said pipe clamp, said head being resilient relative to said shank in said axial direction.

7. A method of forming a pipe connection in an exhaust system of a motor vehicle, said method comprising the steps of:

selecting a first exhaust pipe;

selecting a second exhaust pipe with an axially split end;

selecting a pipe clamp, said pipe clamp being adjustable via a bolt and a nut;

fitting said axially slit end of said second exhaust pipe over an end of said first exhaust pipe;

fitting said pipe clamp over said axially slit end of the second exhaust pipe;

fitting a clamping piece between lugs defined at opposite ends of said pipe clamp;

fitting a shaped piece between one of the lugs and said nut; and rotating said nut to adjust an inner periphery of said pipe clamp to frictionally engage said axially split end of the second exhaust pipe and to bias said axially split end of the second exhaust pipe into frictional engagement with said first exhaust pipe;

wherein said bolt includes a head and a shank defining an axial direction of said bolt, said head including a surface which engages a mating surface of said pipe clamp, said head being resilient relative to said shank in said axial direction.

* * * * *